July 3, 1962 L. KADLEC 3,042,866
MEANS FOR SAMPLING A PLURALITY OF D.C. SIGNALS
Filed Aug. 27, 1959
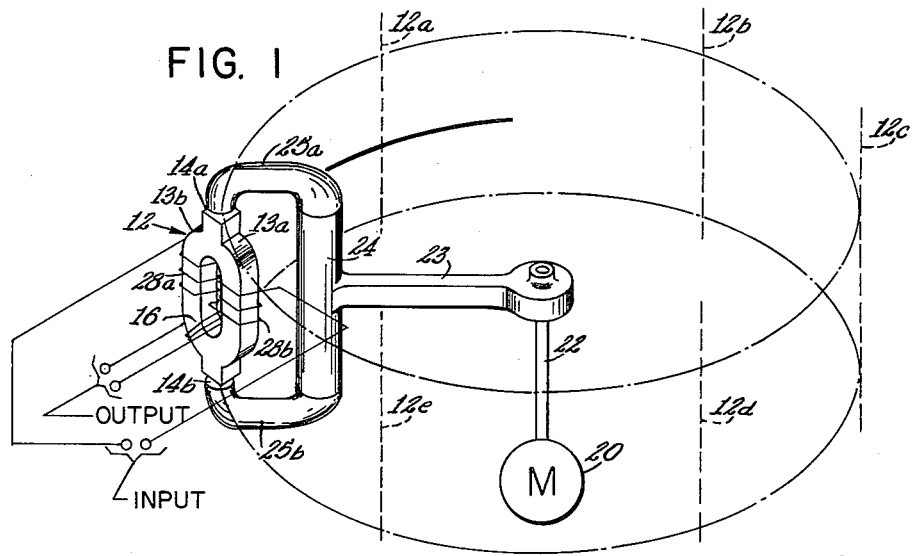
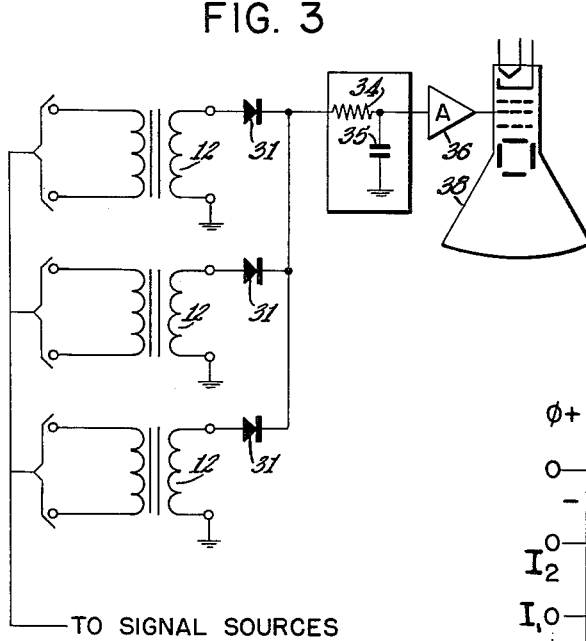
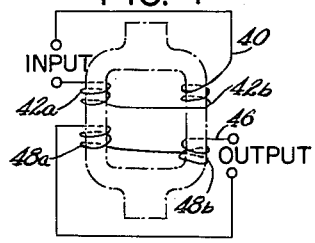
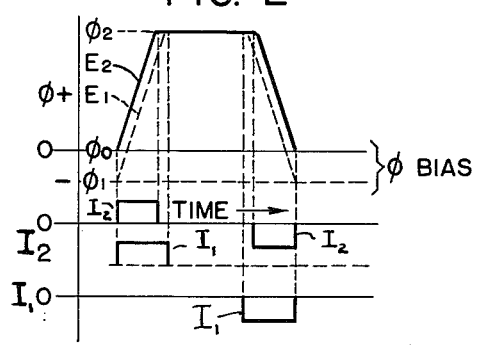
*INVENTOR.*
LADISLAV KADLEC
BY
*Leonard H. King*

United States Patent Office 3,042,866
Patented July 3, 1962

3,042,866
MEANS FOR SAMPLING A PLURALITY OF D.C. SIGNALS
Ladislav Kadlec, Jackson Heights, N.Y., assignor to Avien, Inc., Woodside, N.Y.
Filed Aug. 27, 1959, Ser. No. 836,397
4 Claims. (Cl. 324—117)

This invention relates to a means for sampling a plurality of D.C. signals and to an improved D.C. signal switching means.

In many applications there is a need to monitor and periodically sample in sequence, a number of low level D.C. signal sources. Typical, of such applications, is the monitoring of the temperature of critical parts of machines by means of thermistor elements distributed strategically. Conventional "make and break" contact type switching means do not prove entirely satisfactory for this purpose because of circuit noise that they generate. There is, therefore, a need for an improved device avoiding the use of "make and break" contacts. Particularly, there is a need for switching means which are capable of high speed operation, long life, and freedom from the generation of radio frequency. The generation of radio frequency noise can seriously interfere with communication and control equipment aboard an aircraft.

This invention provides a means for obtaining a D.C. output signal which is a function of a sampled D.C. input signal without the use of moving contacts. Simply stated, the invention employs a saturable ferro-magnetic core about which there is wound an input winding and an output winding and a moving permanent magnet having its opposing poles arranged to mate with the core so as to permit the core to serve as a flux path for the magnetic field of the magnet. The dimensions of the core are so chosen that when subjected to the maximum available magnet flux, saturation of the core will occur irrespective of the presence of a D.C. signal in the input winding. The D.C. signal to be sampled is passed through the input winding producing a biasing flux in the core. As the magnet approaches and then traverses the core, the core is increasingly subjected to the field of the magnet. The time necessary for saturation of the core will depend on the presence or absence of a D.C. bias signal. Through the medium of transformer action there is induced a current in the secondary winding. The input circuit includes dual magnetic paths, with series opposed windings, preventing the induction of current in the primary circuit. Since the induced current is related to the first derivative of the flux, i.e. the change of flux, it will be appreciated that current will be induced only during the period when a change in flux occurs. Therefore, the longer the time required to achieve saturation the longer the duration of the output pulse. Accordingly, the output pulse length will be a function of the biasing signal being sampled. The output waveform will be, in the ideal case, a pulse of constant amplitude but whose length or duration is a function of the bias signal.

An object of this invention is to provide high speed sampling means not employing switching contacts or relying on the "making or breaking" of contact.

It is an object of this invention to provide contact-less commutation of D.C. signals.

A particular object of this invention is to provide a signal sampling device having an input circuit isolated from an output circuit and includes means for preventing the feedback of spurious signals to a signal source connected to the input circuit.

Still other objects and advantages of this invention will be pointed out with particularity or will become obvious as the following description proceeds taken in conjunction with the accompanying drawing wherein:

FIGURE 1 shows pictorially the switching apparatus of this invention with a representative switching element shown and the position of other like switching elements indicated by dashed lines.

FIGURE 2 shows graphically the relationship between flux, density, the induced current and voltage with respect to position of a magnet traversing a core for the conditions of (1) a D.C. signal present and (2) a D.C. signal absent.

FIGURE 3 shows, by means of a circuit diagram, a typical apparatus embodying this invention.

FIGURE 4 shows schematically an alternate winding arrangement.

In FIGURE 1 there is shown a ferro-magnetic core member 12. A number of such core members are mounted about the periphery of a circle, such locations being shown by the designations 12a, 12b, etc. Each of the core pieces 12 includes a parallel magnetic flux path 13a and 13b which merge in common poles 14a and 14b. About core portion 13b there are provided windings 28a and 28b into which there is fed a D.C. signal to be sampled.

Windings 28a and 28b are serially connected in opposition so as to cancel out any spurious signal produced by the changing of the flux through the parallel flux path.

Motor 20 is arranged to drive shaft 22, to which is coupled an arm 23 carrying a permanent magnet 24. Associated with magnet 24 are pole pieces 25a and 25b. Permanent magnet 24 is rotated with constant angular velocity so that the air gap between its pole pieces 25a and 25b is periodically shunted by a saturable core 12. There is induced, as a result, a transient flux in core 12, which is biased by a D.C. signal current in primary windings 28a and 28b of the core. The core member 12 is so designed that when subjected to the total flux produced by the magnet 24 saturation of the core occurs even if the D.C. signal current is zero. The design of a core to be saturated by a magnetic field of a given strength is conventional practice in the art and need not be described herein.

In the secondary winding 16, there is induced a current whose value is the first derivative of the induced flux. Thus, the secondary signal amplitude is directly related to the D.C. primary signal, provided that the slope of induced flux is constant.

An understanding of the mode of signal generation is provided by reference to FIGURE 2. Lines $E_1$ and $E_2$ represent the rise in flux, $\phi$, with respect to time. The position of the magnet with relation to the core being sampled is, of course, directly related to time. At time "zero," when the magnet 24 first begins to subject the particular core 12 to the effect of its field the flux in the core is zero ($\phi_0$) in the absence of a D.C. signal. If a D.C. bias signal is present, then a negative bias flux ($-\phi_1$) exists. The flux increases at the same rate whether or not a D.C. bias voltage is present. This is shown by lines $E_1$ and $E_2$ having the same slope. The voltage generated in secondary winding 16 is proportional to $$\frac{d\phi}{dt}$$

thus irrespective of the presence of a bias signal the output voltage will be constant and therefore the output current will be of the same amplitude in both cases. However, since saturation of the core occurs at ($\phi_2$) for both cases, the duration of the output pulse will be longer for the bias signal present case. In fact, the length of the output pulse is proportional to the amplitude of the D.C. bias signal. In the ideal case the pulse will be rectangular in shape. The shape of the pole pieces may be adjusted in accordance with the standard principles of D.C. generator design to provide a constant change in flux when the magnet traverses the core members at constant velocity.

As the magnet begins to pass away from the particular core member a change in flux density once again begins to occur resulting in the inducing of a negative pulse.

In FIGURE 3 there is shown a diode 31 connected to the output of the core member 12. The diode 31 is arranged to clip the negative pulses and prevent interaction of parallel elements. The positive pulses are then fed into an integrator circuit. The typical integrating circuit shown consists of resistance 34 and a capacitance 35. The integrated output voltage represents the area of the output curve and accordingly corresponds to the level of the D.C. input signal.

The integrated pulses are then amplified by amplifier 36, and fed to an indicator means, such as a recording means, or the oscilloscope display 38 shown by way of example. The time base for the oscilloscope sweep can be suitably adjusted by conventional oscilloscope circuit techniques so that, as the cores 12a and 12b, etc. are traversed, a given portion of the display will always present an indication of the same sampled voltage. The display may be calibrated to show the location of the particular source sampled.

It is to be understood that the core member output pulse may be employed to actuate control mechanisms set to respond to pulses of a given duration.

In FIGURE 4 there is shown an alternative winding arrangement wherein an input circuit 40 comprising windings 42a and 42b wound upon separate branches of core member 15. The windings are wound in series opposition so that when the ends of the core member 15 are connected to a magnetic source the flux produced in each of the parallel flux patterns produces canceling currents in windings 42a and 42b respectively. The output circuit 46 embodies a pair of windings 48a and 48b connected in an aiding relationship. This circuit will provide a greater output than that shown in FIGURE 1 after the same number of turns are employed on each of the core portions as in the embodiment of FIGURE 1.

In the illustrative embodiment reference was made to the application of a negative bias. For certain computing purposes it may be desirable to employ a positive bias. This will result in an output signal inversely proportional to the input signal.

What is claimed is:

1. A D.C. voltage sampling apparatus for sensing D.C. voltages provided by a plurality of D.C. voltage sources comprising: a permanent magnet producing a magnetic field and having a pair of poles of opposite polarity, means to sweep said magnet repetitively at a constant velocity over a given path; a plurality of magnetic cores capable of being saturated by the flux produced by the field of said magnet, said cores being arranged along said given path so that said magnet will cause each of said cores to become temporarily flux saturated as said magnet traverses said given path, said cores disposed in spaced relation to said magnet whereby only one core at a time can be flux-saturated by said magnet; an input winding wound upon each of said saturable cores, said magnetic cores being provided with a pair of parallel paths for the flux produced by said magnet and said input winding comprising a pair of windings serially arranged in a bucking relationship, each of said pair of windings being wound upon a different one of said pair of parallel paths whereby signals generated in said pair of windings by flux variations cancel out; means individually connecting one of said D.C. voltage sources to a respective one of said input windings in a polarity relationship such that D.C. voltage applied to the said input winding will produce a bias flux in at least part of said input winding opposing the said flux normally produced in the said core by the magnet; an output winding wound upon a portion of said cores for providing output pulses whenever said cores are traversed by said magnet and means responsive to said output pulses for indicating the magnitude of the corresponding D.C. voltage.

2. The apparatus of claim 1 wherein said output winding comprises a pair of windings serially arranged in an aiding relationship, each of said pair of windings being wound upon a different one of said pair of parallel paths.

3. An apparatus for indicating the magnitude of a D.C. signal provided by a low level D.C. voltage source comprising: a saturable magnetic core; an input winding and an output winding wound about said core, said windings being coupled together only by said core, said magnetic core being provided with a pair of parallel paths for the flux produced by said magnet and said input winding comprising a pair of windings serially arranged in a bucking relationship, each of said pair of windings being wound upon a different one of said pair of parallel paths whereby signals generated in said pair of windings by flux variations cancel out; means for coupling said input winding to said D.C. voltage source whereby there is induced in said core a bias flux proportional to said D.C. signal; a magnet having a field capable of producing a flux saturating said core; means to temporarily subject said core to the field of said magnet so as to induce flux in said core at least part of said flux being opposite in polarity to said bias flux and to produce output current pulses of a first and a second polarity in said output winding, said pulses having a duration indicative of said magnitude of said D.C. signal; means for clipping the said pulses of said first polarity so as to pass only said pulses of said second polarity; means in cascade with said clipping means for integrating said pulses of said second polarity to produce a control signal indicative of the D.C. input signal; and means responsive to said control signal for providing an indication of the magnitude of said D.C. input signal.

4. The apparatus of claim 3 wherein said output winding comprises a pair of windings serially arranged in an aiding relationship, each of said pair of windings being wound upon a different one of said pair of parallel paths.

References Cited in the file of this patent

UNITED STATES PATENTS

| | | |
|---|---|---|
| 2,740,110 | Trimble | Mar. 27, 1956 |
| 2,741,757 | Devol | Apr. 10, 1956 |
| 2,856,584 | Stratton | Oct. 14, 1958 |
| 2,967,949 | Loewe | Jan. 10, 1961 |